United States Patent [19]
Arai et al.

[11] Patent Number: 4,992,707
[45] Date of Patent: Feb. 12, 1991

[54] VERTICAL DEFLECTION CIRCUIT OF PICTURE DISPLAY UNIT

[75] Inventors: Ikuya Arai; Kouji Kitou, both of Yokohama, Japan

[73] Assignee: Hitachi, Ltd., Tokyo, Japan

[21] Appl. No.: 508,704

[22] Filed: Apr. 13, 1990

[30] Foreign Application Priority Data

Apr. 17, 1989 [JP] Japan ................................. 1-095151

[51] Int. Cl.$^5$ ......................... H01J 29/70; H01J 29/76
[52] U.S. Cl. ..................................................... 315/403
[58] Field of Search ................................. 315/397, 403

[56] References Cited

U.S. PATENT DOCUMENTS 4,361,785 11/1982 Stapleton ............................. 315/389
4,490,653 12/1984 Olmstead ............................ 315/403

FOREIGN PATENT DOCUMENTS

63-131716 6/1988 Japan .

Primary Examiner—Theodore M. Blum
Attorney, Agent, or Firm—Antonelli, Terry, Stout & Kraus

[57] ABSTRACT

The present invention relates to a vertical deflection circuit of a picture display unit which is capable of displaying pictures against variety of scanning frequencies. There are provided: a vertical oscillation means which generates a deflection voltage ($V_{SAW}$) synchronizing with a vertical synchronizing signal (VD), includes a constant current source and is capable of varying the amplitude value of said deflection voltage ($V_{SAW}$) by varying the current value of said constant current source; a vertical drive means which obtains a drive signal from the deflection voltage from said vertical oscillation means; a vertical output means which applies a vertical deflection current to a vertical deflecting coil based on the drive signal from said vertical drive means; an amplitude detecting means which detects the maximum amplitude value of a vertical deflection current ($V_s$) applied to said vertical deflecting coil; a comparison means which compares the maximum amplitude value detected by said amplitude detecting means with a reference value which is set by a setting means; and a control means which controls the current value of the constant current source in said vertical oscillation means based on the result of comparison by said comparison means; and in said amplitude detecting means, it is arranged, when the maximum amplitude value of the vertical deflection current is detected, to renew the detected maximum amplitude value, for example, in every vertical period. With this, there is provided a vertical deflection circuit of a picture display unit in which it is possible to maintain the display size in the vertical direction of the picture shown on the scope always constant even if the vertical scanning frequency is varied and also to change above said display size to an optional size, and furthermore, said display size is not varied with element dispersion, temperature characteristic, power source voltage fluctuation and so forth in the vertical drive circuit, the vertical output circuit, the vertical deflecting coil and the like as a primary factor, and good follow-up performance is also obtainable when abovementioned display size is varied.

32 Claims, 8 Drawing Sheets

FIG. 5(a)
V PULSE

FIG. 7(a) V PULSE
FIG. 7(b) M DECODE PULSE
FIG. 7(c) N DECODE PULSE
FIG. 7(d) GATE PULSE
FIG. 7(e) VD
FIG. 7(f) Vq

VERTICAL DEFLECTION CIRCUIT OF PICTURE DISPLAY UNIT

BACKGROUND OF THE INVENTION

The present invention relates to a vertical deflection circuit of a picture display unit which is capable of displaying a picture in accordance with a variety of scanning frequencies.

In a picture display unit used in a computer terminal and the like, display position and display size of picture or scanning frequency, etc. on a scope have wide variety in recent years. Therefore, there has been such a problem that production in small quantities for a wide variety has to be performed in accordance with a plurality of input signals, thus deteriorating productivity.

Thereupon, picture display units which are capable of displaying pictures corresponding to a variety of scanning frequencies have been proposed in order to meet the variety of scanning frequencies as described above.

In such a picture display unit, however, there has been a problem that, when an ordinary sawtooth-wave generating circuit is used as a vertical oscillation circuit of a vertical deflection circuit, the amplitude of the sawtooth voltage which is output from the sawtooth-wave generating circuit is varied, when the vertical scanning frequency is varied, in reverse proportion to the variation of the vertical scanning frequency, thus resulting in variation of the display size in the vertical direction of a picture which is displayed on the scope.

Therefore, picture display units that are disclosed, for example, in Japanese Patent Laid-Open No. 63-131716 (JP-A-63-131716), etc. have been proposed as a conventional picture display unit which had solved such problems.

A conventional example disclosed in Japanese Patent Laid-Open No. 63-131716 (JP-A-63-131716) will be described hereafter with reference to FIG. 1.

Figure 1:
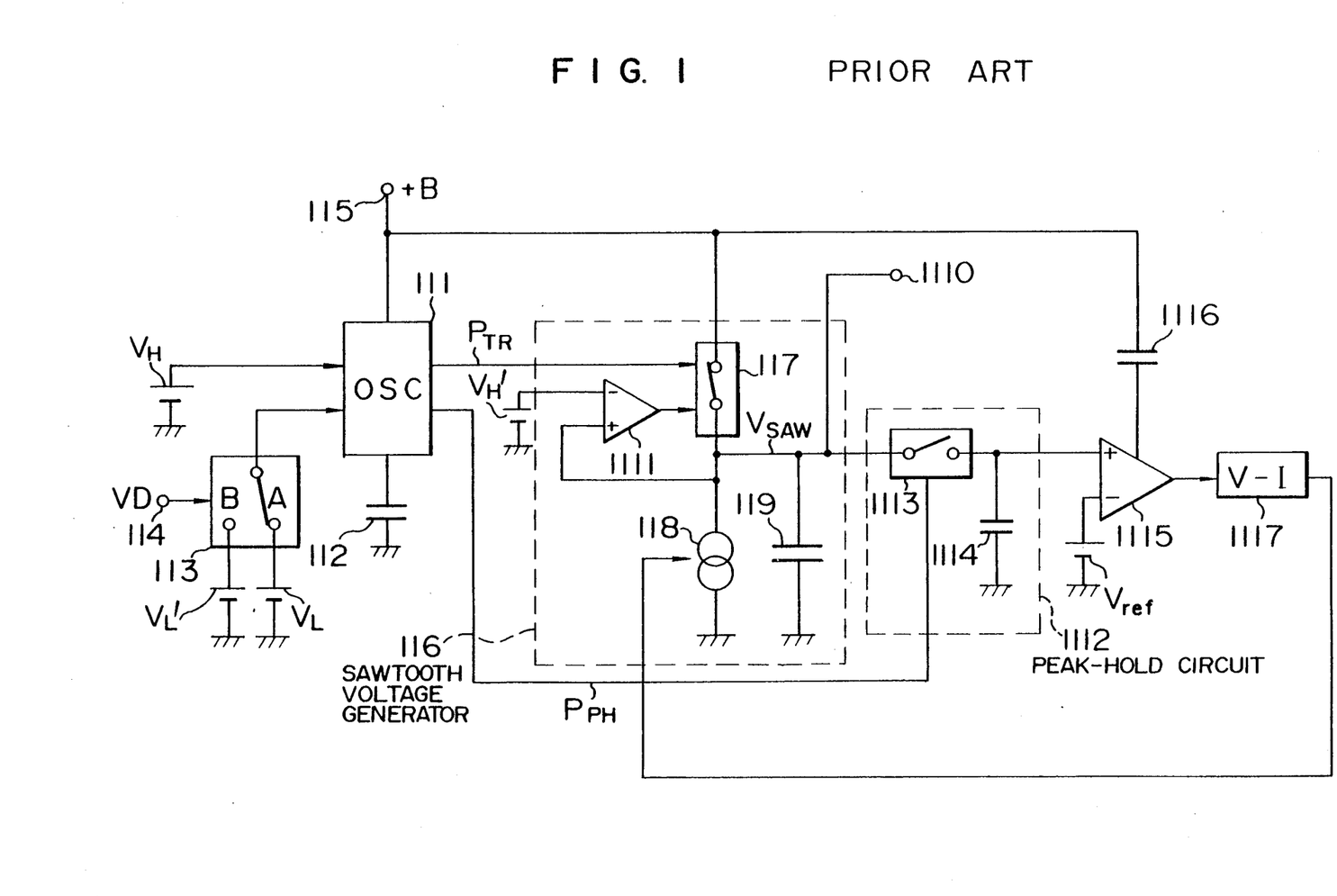
FIG. 1 is a circuit diagram showing a principal part of a conventional vertical deflection circuit of a picture display unit.

FIG. 1 is a circuit diagram showing a principal part of a conventional picture display unit, and those parts shown in FIG. 1 show a vertical oscillation circuit portion in a vertical deflection circuit of a picture display unit.

In FIG. 1, a numeral 111 denotes an oscillator, 112 denotes a capacitor for oscillation, 113 denotes a switch, 114 denotes a vertical synchronizing pulse input terminal, 115 denotes a power source voltage input terminal, 116 denotes a sawtooth voltage generator, 117 denotes a switch, 118 denotes a constant current source, 119 denotes a capacitor, 1110 denotes a sawtooth voltage output terminal, 1111 denotes a comparator, 1112 denotes a peak-hold circuit, 1113 denotes a switch, 1114 denotes a holding capacitor, 1115 denotes a comparator, 1116 denotes a capacitor and 1117 denotes a voltage-current converter.

In this conventional example, when a vertical synchronizing pulse VD is input to the input terminal 114, the switch 113 is changed-over alternately between a terminal A and a terminal B in accordance with the level of the vertical synchronizing pulse VD. With this, the oscillator 111 oscillates, thereby to generate a voltage in the capacitor 112. The waveform of this voltage is a sawtooth waveform, and the maximum voltage level reaches to $V_H$ and the lower limit takes an intermediate level between $V_L$ $V_L'$. In the oscillator 111, the voltage generated in the capacitor 112 is applied with pulse shaping, thus generating a sawtooth wave generation initiating pulse $P_{TR}$ of the sawtooth voltage generator 116 and a sampling pulse $P_{PH}$ of the peak-hold circuit 1112.

In the sawtooth voltage generator 116, when the pulse $P_{TR}$ is input, the switch 117 is put ON and the capacitor 119 is charged rapidly. Then, when the voltage level across the capacitor 119 reaches to $V_H'$, the switch 117 is put OFF by means of the comparator 1111 and the capacitor 119 is discharged through the constant current source 118. In such a manner, a sawtooth voltage $V_{SAW}$ is created and output from the output terminal 1110.

Further, the peak value of the sawtooth voltage $V_{SAW}$ is sampled by means of the switch 1113 of the peak-hold circuit 1112 and is held by the capacitor 1114. The held voltage is always compared with a reference voltage $V_{ref}$ which defines the amplitude of the sawtooth voltage $V_{SAW}$ by means of the comparator 1115, and the error voltage between both is output from the comparator 1115. The output voltage is converted into a current by means of the voltage-current conversion circuit 1117, and controls the current value of abovementioned constant current source 118 thereafter. As a result, the amplitude of the sawtooth voltage $V_{SAW}$ which is output from the output terminal 1110 becomes constant irrespective of the frequency of the input vertical synchronizing signal. In other words, there is no means for changing the amplitude.

That is, in this conventional example, the amplitude of the sawtooth voltage $V_{SAW}$ which is output from the output terminal 1110 is always constant even in the case where the vertical scanning frequency is varied. Therefore, it is possible to maintain the display size in the vertical direction of the picture displayed on the scope always constant.

In the above-described conventional example, however, there have been such problems as described hereunder.

That is, the display size of a picture displayed on a scope generally has different sizes which are optimum depending on video signals which are input to a picture display unit. In the above conventional example, however, the reference voltage $V_{ref}$ which defines the amplitude of the sawtooth voltage $V_{SAW}$ is fixed and cannot be varied. Thus, there has been a problem that even if it is tried to vary the display size so that the display size in the vertical direction becomes optimum, it is impossible to vary it.

Further, the above-described conventional example is a vertical oscillation circuit for a vertical deflection circuit of a picture display unit as described above. Therefore, a vertical drive circuit, a vertical output circuit, a vertical deflecting coil and so forth are connected at the latter stage thereof as a matter of course, but there is a fear that variation of the display size in the vertical direction is also produced by element dispersion, temperature characteristics and power source voltage variations as a primary factor in abovementioned circuits. Therefore, it is required to adjust the reference voltage $V_{ref}$ which defines the amplitude of of the sawtooth voltage $V_{SAW}$ in order to provide the variation, but there has been a problem that it is impossible to provide such variation because the reference voltage $V_{ref}$ is fixed and cannot be varied as described above.

However, even if the reference voltage $V_{ref}$ can be varied and the display size in the vertical direction can be varied freely, it is required to partly discharge the charges stored in the capacitor 1114 of the peak-hold circuit 1112 which holds the peak value of the sawtooth voltage $V_{SAW}$ when it is considered to vary the display size in the vertical direction from a large size to small size for instance. In the above-described example, however, the only outflow path for charges discharged from the capacitor 1114 to flow is to ground through the switch 1113 and the constant current source 118, and moreover, the output impedance of the constant current source 118 is high, thus discharge being performed only gradually. Accordingly, when the display size in the vertical direction is varied, it takes time to settle down at the size to be attained and the follow-up performance is poor.

SUMMARY OF THE INVENTION

It is a principal object of the present invention to provide a vertical deflection circuit of a picture display unit which is capable of maintaining the display size in the vertical direction of a picture displayed on the scope always constant even if the vertical scanning frequency is varied, and is also capable of changing the abovementioned display size to an optional size freely.

It is another object of the present invention to provide a vertical deflection circuit of a picture display unit in which the abovementioned display size does not vary by element dispersion, temperature characteristics, power source voltage variations and so forth in the vertical drive circuit, the vertical output circuit, the vertical deflecting coil and the like as primary factors, and moreover, the follow-up performance is good when display size is varied.

In order to achieve the above mentioned objects, according to the present invention, there are provided, in a picture display unit a vertical oscillation means which generates a deflection voltage synchronous with a vertical synchronizing signal, a constant current source capable of varying the amplitude value of said deflection voltage by varying the current value of the constant current source, a vertical drive means which obtains a drive signal from the deflection voltage from the vertical oscillation means and a vertical output means which applies a vertical deflection current to the vertical deflecting coil based on the drive signal from the vertical drive means, an amplitude detecting means which detects the maximum amplitude value of a vertical deflection current applied to the vertical deflecting coil, a comparison means which compares the maximum amplitude value detected by the amplitude detecting means with a reference value which is set by a setting means, and a control means which controls the current value of the constant current source in the vertical oscillation means based on the result of comparison by the comparison means.

Further, according to the present embodiment, when the maximum amplitude value of the vertical deflection current is detected by the amplitude detecting means, the circuit of the present invention has been arranged so that the detected maximum amplitude value is renewed, for example, in every vertical period.

The above amplitude detecting means detects the maximum amplitude value of the vertical deflection current applied to vertical deflecting coil, and also renews the detected maximum amplitude value, for example, in every vertical period. Comparison means compares the detected maximum amplitude value with the reference value which is set by setting means. Control means control the current value of the constant current source in the vertical oscillation means based on the result of comparison by the comparison means so that the maximum amplitude value and reference value become equal to each other. Here, the vertical oscillation means is capable of varying the amplitude value of the deflection voltage and of varying the current value of the constant current source.

Accordingly, when the frequency of the vertical synchronizing signal is varied and the amplitude value of the deflection voltage which is the output of the vertical oscillation means is varied, the drive siganl which is the output of the vertical drive means varies, and further, the maximum amplitude value of the vertical deflection current applied to the vertical deflecting coil varies. As a result, the display size in the vertical direction of the picture displayed on the scope is varied. However, when the maximum amplitude value of the vertical deflection current varies, control is applied in the direction of suppressing the variation by means of above-described control. Thus, it is possible to maintain the display size in the vertical direction always constant even if the vertical scanning frequency is varied. Accordingly, it becomes possible to respond to every possible vertical scanning frequency, and furthermore, it is possible to absorb all element dispersions, temperature characteristics, and power source voltage variations, etc. even if there is any in the vertical drive circuit, the vertical output circuit, the vertical deflecting coil and the like, and the display size will never be varied because of these as the primary factors.

Moreover, since display size may be changed freely to an optional size by changing the setting of the reference value by means of the setting means, it is possible to obtain an optimum size in accordance with the input video signal.

Furthermore, according to the present invention, the detected amplitude value is renewed, for example, in every vertical period, when the amplitude value of the vertical deflection current is detected by the amplitude detecting means. Therefore, good follow-up performance is attainable when the abovementioned display size is varied.

BRIEF DESCRIPTION OF THE DRAWINGS

Preferred embodiments of the present invention will now be described in conjunction with the accompanying drawings, in which:

FIGS. 3a-3f show waveform diagrams for signal waveforms at principal parts in FIG. 2;

FIGS. 7a-7f, show waveform diagrams for signal waveforms at principal parts of FIG. 6;

DESCRIPTION OF THE PREFERRED EMBODIMENTS

A first embodiment of the present invention will be described hereafter.

Figure 2:
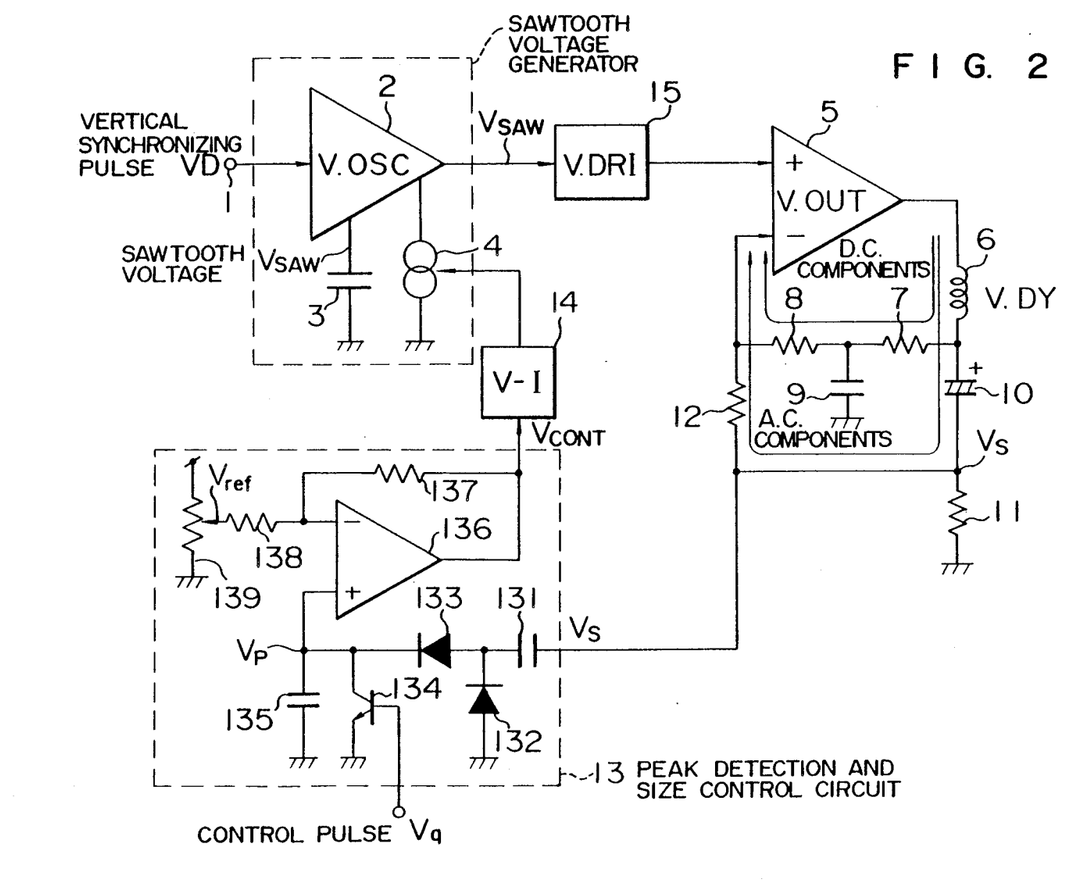
FIG. 2 is a circuit diagram showing a first embodiment of the present invention.

FIG. 2 is a circuit diagram showing a principal part of a picture display unit as the first embodiment of the present invention, and the part shown in FIG. 2 shows a vertical deflection circuit portion of a picture display unit.

In FIG. 2, a numeral 1 denotes a vertical synchronizing pulse input terminal, 2 denotes a vertical oscillation circuit which outputs a sawtooth voltage $V_{SAW}$, 3 denotes a capacitor, 4 denotes a constant current source which determines the amplitude of the sawtooth voltage $V_{SAW}$, 5 denotes a vertical output circuit, 6 denotes a vertical deflecting coil, 7, 8 and 12 denote resistances, 9 and 10 denote capacitors, and 11 denotes a detection resistance. Further, 13 denotes a peak detection and size control circuit, which is composed of a clamping capacitor 131, a clamping diode 132, a rectifying diode 133, a discharge transistor 134, a peak-value-hold capacitor 135, an operational amplifier 136, resistances 137 and 138, and a reference voltage setting volume 139. Further, 14 denotes a voltage-current conversion circuit and 15 denotes a vertical drive circuit.

The operation of FIG. 2 will be described in conjunction with FIG. 3.

Figures 3A, 3F:
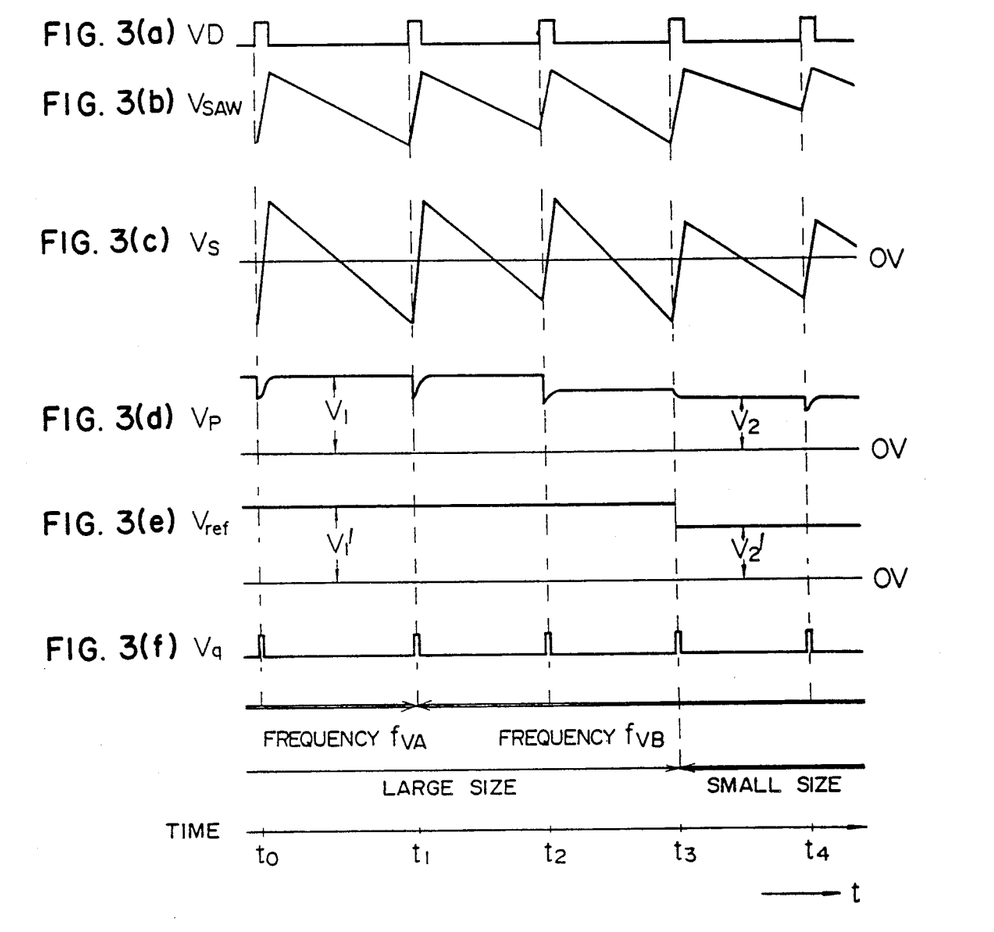

FIG. 3 shows waveform diagrams showing signal waveforms at principal parts of FIG. 2.

In FIG. 2, a circuit consisting of the vertical oscillation circuit 2, the capacitor 3 and the constant current source 4 almost correspond to the circuit consisting of the oscillator 111, the switch 113 and the sawtooth voltage generator 116 shown in FIG. 1, and in particular, the capacitor 3 and the constant current source 4 correspond to the capacitor 119 of FIG. 1 and the constant current source 118 of FIG. 1, respectively.

Thereupon, when vertical synchronizing pulses VD shown in FIG. 3(a) are input to the terminal 1, the vertical oscillating circuit 2 starts oscillation in synchronization with the leading edges of the vertical synchronizing pulses VD. As a result, a sawtooth voltage $V_{SAW}$ as shown in FIG. 3(b) is obtained at the capacitor 3, and the sawtooth voltage $V_{SAW}$ is output to the vertical drive circuit 15. Here, the gradient of the leading edge of the sawtooth voltage $V_{SAW}$ is determined principally by means of the values of internal circuit elements C and R of the vertical oscillation circuit 2, but the gradient of the trailing edge thereof is determined by the current value of the constant current source 4. Thus, it is possible to vary the amplitude of the sawtooth voltage $V_{SAW}$ by varying the current value of the constant current source 4.

That is, as described later, the amplitude of the vertical sawtooth-wave does not very even if the frequency is varied from $f_{VA}$ to $f_{VB}$ ($f_{VA} < f_{VB}$) when certain display size conditions are set. The amplitude of the sawtooth-wave varies momentarily, but it returns to the original amplitude in the next moment. Next, it is described how to follow up when the display size is varied from large to small at the same frequency. The amplitude of the sawtooth-wave is varied by varying the display size from large to small.

In the next place, the sawtooth voltage $V_{SAW}$ which is input to the vertical drive circuit 15 is converted into a drive signal in a pulse form in circuit 15 and applied to one input terminal of the vertical output circuit 5. The vertical output circuit 5 applies a vertical deflection current to the vertical deflecting coil 6 based on the input drive signal.

Among the vertical deflection currents applied to the vertical deflecting coil 6, the d.c. components and the a.c. components are fed back to another input terminal of the vertical output circuit 5 through a filter composed of the resistances 7 and 8 and the capacitor 9 and through the capacitor 10 and the resistance 12, respectively. Further, the a.c. components which have passed through the capacitor 10 are detected by the detection resistance 11. As the result of such detection, a detected voltage Vs shown in FIG. 3 (c) is obtained.

Next, in the peak detection and size control circuit 13, the detected voltage Vs is clamped by the diode 132 and the capacitor 131, and rectified thereafter by the diode 133. The peak value of the voltage obtained after such rectification is held as charge in the capacitor 135, and the held charge is discharged through the transistor 134 which conducts for a predetermined period within the vertical blanking period (that is, a period when the control pulse Vq is at a high level) by means of the control pulse Vq shown in FIG. 3 (f). Thus, the voltage Vp held by the capacitor 135 shows such a waveform as shown in FIG. 3 (d).

Then, the voltage Vp held by the capacitor 135 is compared with a reference voltage $V_{ref}$ shown in FIG. 3 (e) which is set by a volume control 139 disposed on the front portion of the picture display unit in the operational amplifier 136, and an error voltage between both is amplified and output from the output of the operational amplifier 136. The output error voltage is converted into a current in a voltage-current conversion circuit 14, and this output controls the current value of the above-described constant current source 4 thereafter.

The above is the description of the operation of FIG. 2 under such a stationary state that neither the frequency of the vertical synchronizing signal nor the display size in the vertical direction is varied.

In the next place, the operation when the frequency of the vertical synchronizing signal, viz., the vertical scanning frequency is varied and when the display size in the vertical direction is varied will be described.

When the freqency of the vertical synchronizing signal which is input to the vertical deflection circuit at the time $t_1$ shown in FIG. 3 is varied from $f_{VA}$ to $f_{VB}$ (provided that frequency $f_{VA}$ < frequency $f_{VB}$), there is no change in the current value of the constant current source 4 immediately after the change-over. Therefore, there is neither change in the slopes of trailing edges of the sawtooth voltage $V_{SAW}$ and the detected voltage Vs. However, since it is assumed that freqnecy $f_{VA}$ < frequency $f_{VB}$, the amplitude of the detected voltage Vs becomes smaller at the beginning of the next vertical period, that is, immediately after the time $t_2$. With this, the voltage Vp held by the capacitor 135 is lowered from $V_1$ and the error voltage which is output from the operational amplifier 136 is also lowered.

Thus, the current value of the constant current source 4 is controlled in the direction of increasing the current value.

In such a manner, it is possible to perform operation so as to maintain the display size in the vertical direction always constant by keeping the reference voltage $V_{ref}$ constant even if the frequency of the vertical synchronizing signal, viz., the vertical scanning frequency is varied. In contrast with this, when the frequency of the input vertical synchronizing signal varies from $f_{VB}$ to $f_{VA}$, the gradient thereof becomes slower and bigger.

In the next place, when the volume control 139 is adjusted at the time $t_3$ so as to lower the reference voltage $V_{ref}$ from $V_1'$ to $V_2'$, the error voltage which is output from the operational amplifier 136 increases, thereby applying control to the current value of the constant current source 4 in the decreasing direction. As a result, amplitudes of the sawtooth voltage $V_{SAW}$ and the detected voltage Vs also decrease, and the display size in the vertical direction becomes smaller.

In such a manner, the display size in the vertical direction can be varied freely by adjusting the volume control 139 so as to vary the set reference voltage $V_{ref}$.

As described above, according to a first embodiment of the present invention, it is possible to maintain the display size in the vertical direction always constant even if the vertical scanning frequency is varied, and moreover, it is possible to vary the display size freely by varying the set reference voltage $V_{ref}$ by adjusting the volume control 139.

Furthermore, in the first embodiment of the present invention, the current value of the constant current source 4 is controlled fundamentally based on the amplitude value of the vertical deflection current applied to the vertical deflecting coil 6. Therefore, all element dispersion, temperature characteristics, power source voltage variations and so forth can be absorbed even if there is any, for example, in the vertical drive circuit 15, the vertical output circuit 5, the vertical deflecting coil 6 and the like, and the display size will never vary with the above as a primary factor.

Moreover, in the first embodiment of the present invention, charges held by the capacitor 135 are discharged in every vertical period through the transistor 134. Thus, the voltage Vp held by the capacitor 135 can correspond quickly to the variation of the amplitude of the detected voltage Vs as shown in FIG. 3 (d), thereby obtaining good follow-up performance when abovementioned display size is varied.

Next, description will be made on a circuit which creates the vertical synchronizing pulses VD which are input to the input terminal 1 and the control pulses Vq which control the transistor 134.

Figure 4:
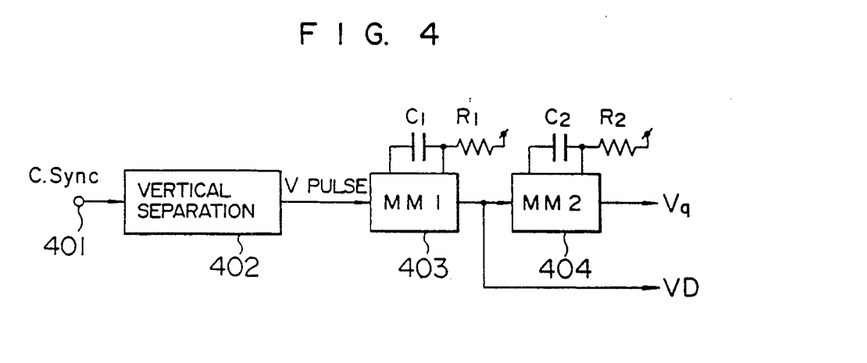
FIG. 4 is a block diagram showing an embodiment of a circuit for creating a vertical synchronizing pulse VD and a control pulse Va shown in FIG. 2.

FIG. 4 is a block diagram showing an embodiment of the circuit which creates the vertical synchronizing pulses VD and the control pulses Vq both shown in FIG. 2. Further, FIG. 5 shows waveform diagrams showing waveforms at principal parts in FIG. 4.

In FIG. 4, 401 denotes a composite synchronizing signal input terminal, 402 denotes a vertical separation circuit, 403 denots a first monomultivibrator and 404 denotes a second monomultivibrator.

The operation of FIG. 4 will be described hereunder.

Figures 5A, 5B, 5C:
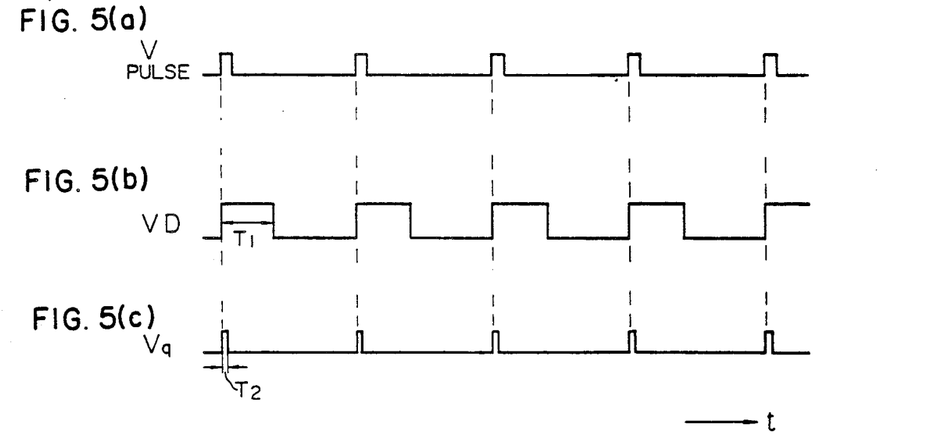
FIGS. 5a-5c show waveform diagrams for signal waveforms at principal parts of FIG. 4.

Only the vertical synchronizing signal of composite synchronizing signal C.Sync which is input to the composite synchronizing signal input terminal 401 is separated in the vertical separation circuit 402, and V pulses having a positive polarity shown in FIG. 5 (a) which synchronize with the separated vertical synchronizing pulses are generated. These V pulses are input to the first monomultivibrator and generate the vertical synchronizing pulses VD shown in FIG. 3 (a) and FIG. 5 (e) in synchronization with the leading edges thereof. These vertical synchronizing pulses VD have the width which is expressed by $T_1 \alpha C_1 \times R_1$ and almost equal to the vertical blanking period, and are supplied to the vertical oscillation circuit 2 shown in FIG. 2.

Furthermore, the vertical synchronizing pulses VD are also supplied to the second monomultivibrator 404, and generate the control pulses Vq shown in FIG. 5 (f) which synchronize with the leading edges of the vertical synchronizing pulses VD. The pulse width $T_2$ of the control pulses Vq is expressed by $T_2 \alpha C_2 \times R_2$ and is set narrower than the vertical blanking period. The charges stored in the abovementioned peak-value-hold capacitor 135 are discharged during this period $T_2$.

Figure 6:
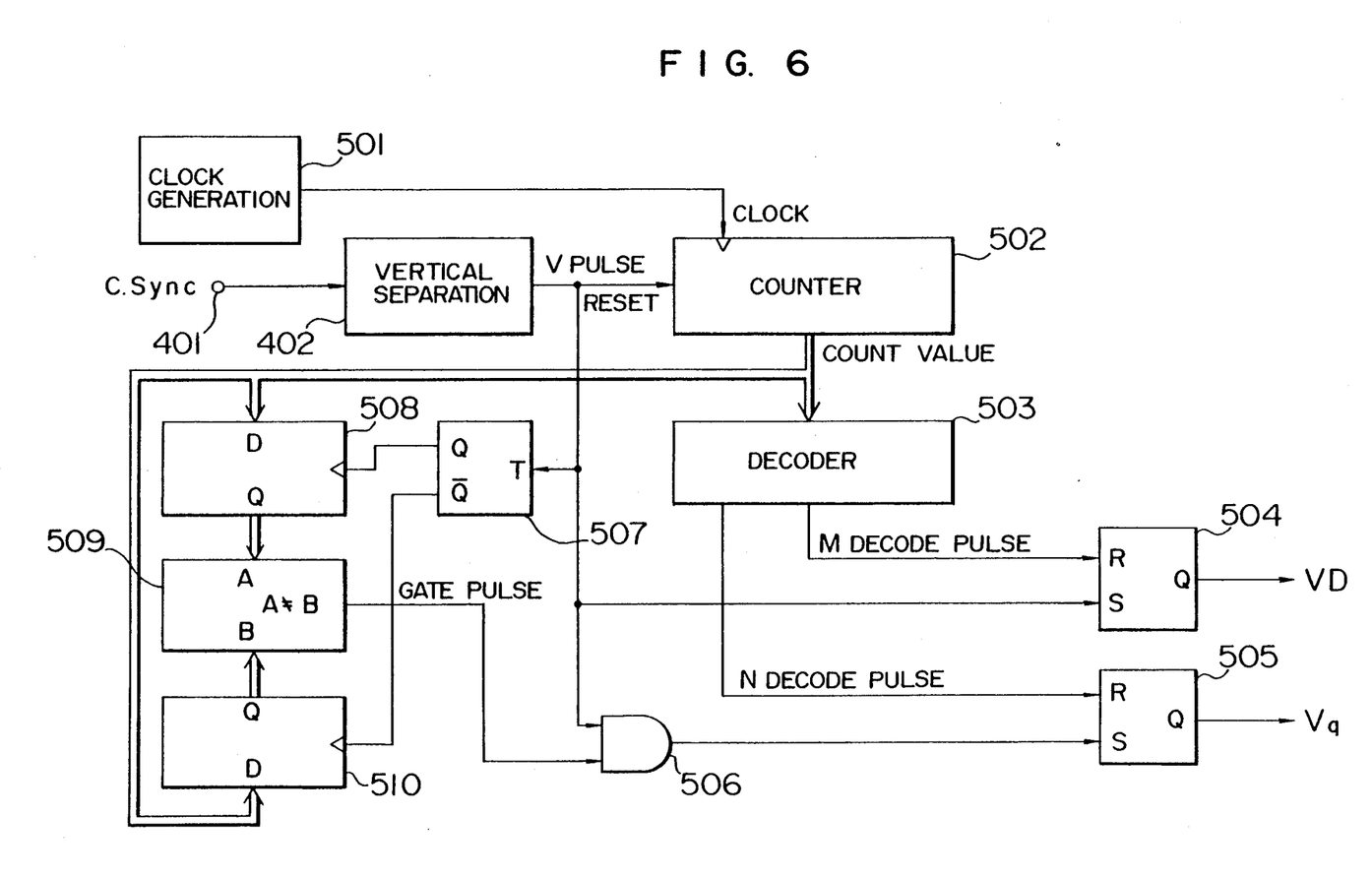
FIG. 6 is a block diagram showing another embodiment of a circuit for creating a vertical synchronizing pulse VD and a control pulse Va shown in FIG. 2.

FIG. 6 is a block diagram showing another exemplification of the circuit which creates the vertical synchronizing pulses VD and the control pulses Vq shown in FIG. 2.

In FIG. 6, 501 denotes a clock generating circuit, 502 denotes a counter circuit, 503 denotes a decoder circuit, 504 and 505 denote S-R type flip-flop circuits, 506 denotes an AND gate, 507 denotes a T-type flip-flop circuit, 508 and 510 denote latch circuits, and 509 denotes a mismatch detection circuit. Other parts that are same as those shown in FIG. 4 are affixed with same marks.

The operation of the block diagram shown in FIG. 6 will be described in conjunction with FIG. 7.

Figures 7A, 7F:
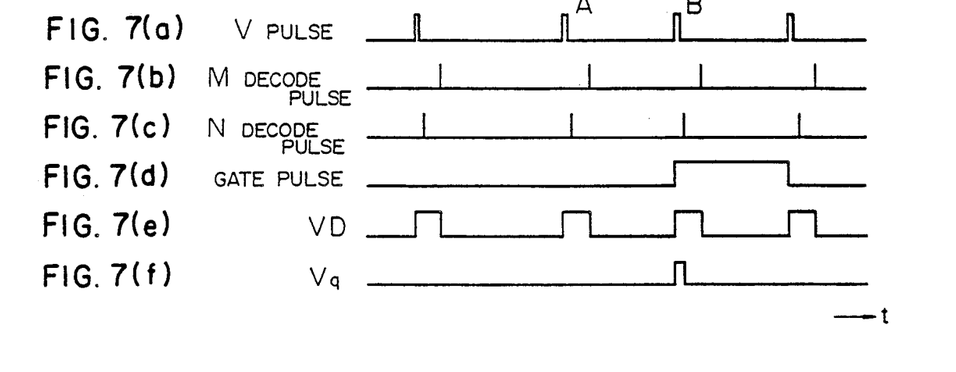

FIG. 7 shows waveform diagrams showing signal waveforms at principal parts of FIG. 6.

In FIG. 6, the V pulses obtained in the vertical separation circuit 402 have a waveform as shown in FIG. 7 (a), and are input to a reset input of the counter circuit 502. The counter circuit 502 which is set by the input of this V pulse counts pulses generated in the clock generating circuit 501 until the next V pulse is input. The count value of the counter circuit 502 is decoded in the decoder circuit 503, and the decoder circuit 503 outputs N decode pulses shown in FIG. 7 (c) when the count value=N and outputs M decode pulses shown in FIG. 7 (b) when the count value=M, respectively.

In the S-R type flip-flop circuit 504, the M decode pulses are input as a reset input and the V pulses are input as a set input, and the vertical synchronizing pulses shown in FIG. 7 (e) are generated.

Furthermore, the count value of the counter circuit 502 is also supplied to the latch circuits 508 and 510, and those that are obtained by frequency division of the V pulses in the T-type flip-flop circuit 507 are applied as latch clocks of the latch circuits 508 and 510. With this, the count values corresponding to vertical period data at the present moment are stored in the latch circuit 508, and the count values corresponding to vertical period data immediately therebefore are stored in the latch circuit 510. Then, it is detected whether those vertical periods are matched with each other in the mismatch detection circuit 509 based on the outputs of these latch circuits 508 and 510.

Here, it is assumed that, for example, the frequency of the vertical synchronizing signal, viz., the vertical scanning frequency is varied at a point A of the V pulses as shown in FIG. 7 (a), the mismatch detection circuit 509 outputs a gate pulse as shown in FIG. 7 (d) at a point B where the next V pulse comes across as the result of detecting a mismatch. By means of this gate pulse, the V pulses pass the AND gate 506 only when this gate pulse is at a high level, thus making it possible to set the S-R type flip-flop circuit 505. On the other hand, N decode pulses are input to the reset input of the S-R type flip-flop circuit 505. Thus, the control pulse Vq is output from the output of the S-R type flip-flop circuit 505 as shown in FIG. 7 (f) only when the frequency of the vertical synchronizing signal, viz., the vertical scanning frequency is varied.

In such a manner, according to the first embodiment of the present invention, the control pulse Vq is output only when the frequency of the vertical synchronizing signal, viz., the vertical scanning frequency is varied. Therefore, when the present embodiment is used as a circuit which creates the vertical synchronizing pulses VD and the control pulse Vq, the charges stored in the capacitor 135 shown in FIG. 2 are discharged only when the vertical scanning frequency is varied when the detected voltage Vs varies and are kept stored under a stationary state. Thus, it is possible to stabilize the operation of the peak detection and size control circuit 13 into a stationary state.

Figure 8:
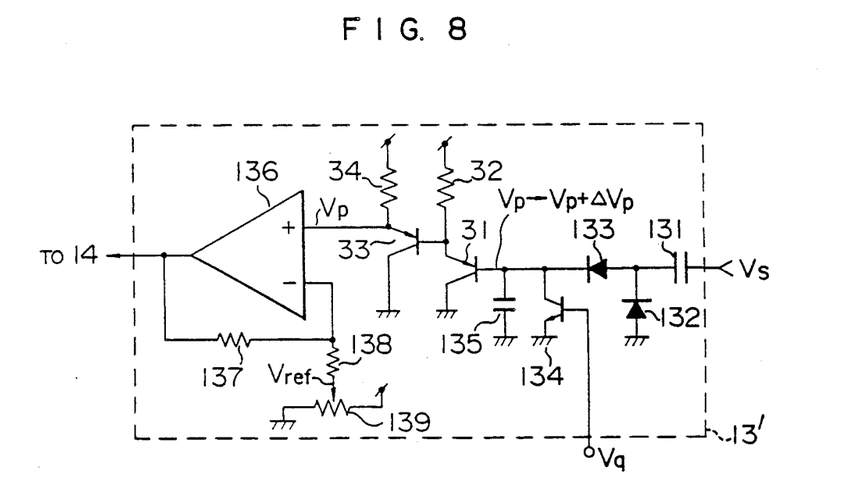
FIG. 8 is a circuit diagram showing an embodiment of a peak detection and size control circuit in FIG. 2.

FIG. 8 is a circuit diagram 13' showing another exemplification of the peak detection and size control circuit 13 of FIG. 2.

In FIG. 8, 13' denotes a peak detection and size control circuit, 31 and 33 denote PNP transistors, and 32 and 34 denote resistances. Other parts that are the same as those shown in FIG. 2 are affixed with the same numerals.

In the peak detection and size control circuit 13 shown in FIG. 2, since the claming diode 132 and the rectifying diode 133 have respective temperature characteristics, voltages across both ends thereof are varied by the variation of the ambient temperature. In other words, the voltages across both ends rise if the ambient temperature rises. Therefore, the voltage Vp held by the peak-value-hold capacitor 135 is also varied from Vp to Vp+ΔVp when the ambient temperature changes, and the display size in the vertical direction is varied to some extent.

Accordingly, in the embodiment shown in FIG. 8, it has been arranged to suppress variation of display size in the vertical direction caused by change of the ambient temperature conversely by compensating temperature characteristics conversely, that is, by compensating in such a direction that the characteristic falls when the ambient temperature rises by means of an emitter-follower circuit consisting of PNP transistors 31 and 33 and resistances 32 and 34. With this, it is possible to perform further stabilized control of the display size.

Figure 9:
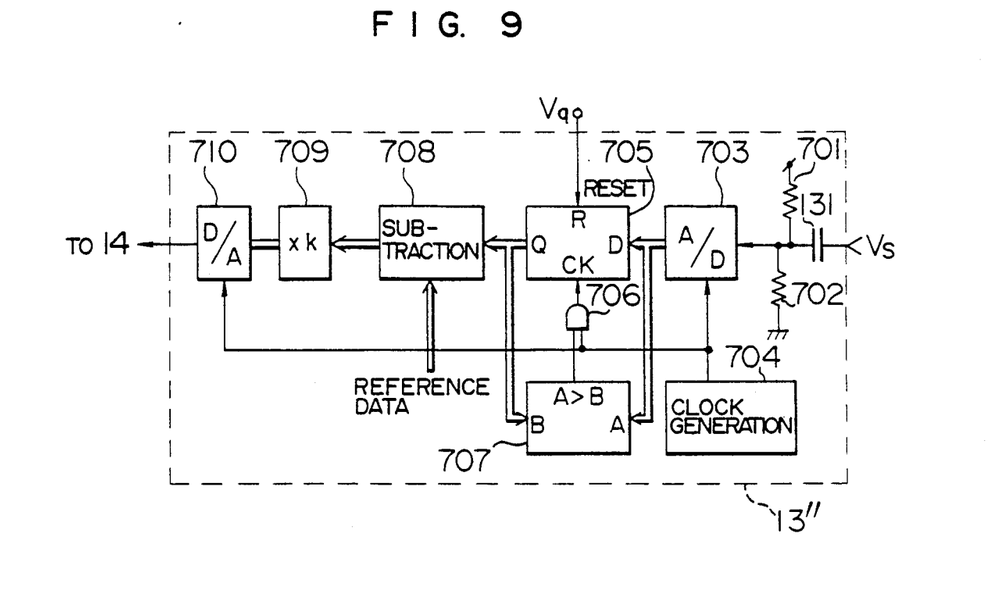
FIG. 9 is a block diagram showing another embodiment of a peak detection and size control circuit in FIG. 2.

FIG. 9 shows a circuit diagram 13" showing still another exemplification of the peak detection and size control circuit 13 of FIG. 2.

The present embodiment is composed of digital circuits.

In FIG. 9, 13" denotes a peak detection and size control circuit, 701 and 702 denote d.c. bias resistances, 703 denotes an analog-digital (abbreviated as A/D hereafter) conversion circuit, 704 denotes a clock generating circuit, 705 is a latch circuit with a reset terminal, 706 denotes an AND gate, 707 denotes a comparator circuit, 708 denotes a subtraction circuit, 709 denotes a coefficient circuit, 710 denotes a digital-analog (abbreviated as D/A hereafter) conversion circuit, and other parts are the same as those shown in FIG. 2 and are affixed with the same numerals.

The detected voltage Vs which is input to the peak detection and size control circuit 13" is input to the A/D conversion circuit 703 with the d.c. level thereof biased with resistances 701 and 702 after the d.c. components thereof are removed by the capacitor 131 and is converted into digital data. Peak values of these digital data are detected by the latch circuit 705, the AND gate 706 and the comparator circuit 707.

That is, relative sizes of input data and output data of the latch circuit 705 are compared with each other by means of the comparator circuit 707. As a result, when it is judged that input data is larger, that input data is replaced with data that have been held so far and held newly by the latch circuit 705, and when it is judged that output data is larger, than data that have been held so far are held intact. Thus, peak values are detected, and such peak value detecting operation is repeated whenever the latch circuit 705 is reset by means of the control pulse Vq.

Next, the difference between the detected peak value and the preset reference data is obtained in the subtraction circuit 708 and is multiplied by a coefficient in the coefficient circuit 709 at the next stage, and thereafter, is converted into an analog voltage in the D/A conversion circuit 710 and output to the voltage-current conversion circuit 14 shown in FIG. 2.

Also, the clock generating circuit generates clock pulses for operating the A/D conversion circuit 703, the latch circuit 705 and the D/A conversion circuit 710.

According to the present embodiment, the circuit is composed of digital circuits. Therefore, the circuit operation will never be affected by the variation of external environment, thus making it possible to perform stabilized operation.

Besides, it is possible to set the reference data that are input to the subtraction circuit 708 not only manually, but also automatically using a microcomputer.

In the next place, other embodiments of the present invention will be described in consecutive order.

Figure 10:
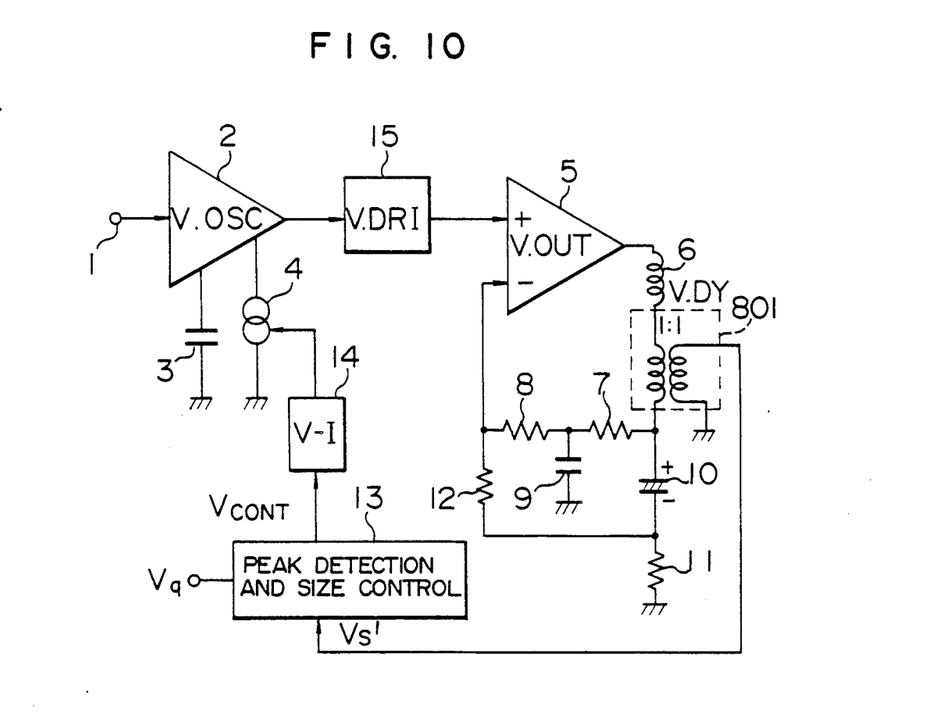
FIG. 10 is a circuit diagram showing a second embodiment of the present invention.

FIG. 10 is a circuit diagram showing a principal part of a vertical deflection circuit of a picture display unit as a second embodiment of the present invention.

In FIG. 10, 801 denotes a transformer for detection, and other parts that are the same as those shown in FIG. 2 are affixed with the same marks.

In the second embodiment of the present invention, a vertical deflection current which is output from the vertical output circuit 5 is applied to the primary side of the transformer 801 through the vertical deflecting coil 6. At this time, when it is assumed that the winding ratio between the primary side and the secondary side in the transformer 801 is 1 to 1, the peak value (amplitude value) of the vertical deflection current is $I_{p-p}$, the length of the vertical blanking period is $t_r$ and the inductance of the secondary winding is L, the voltage Vs' which is induced on the secondary side of the transformer 801 is obtained approximately as:

$$Vs' = L \frac{I_{p-p}}{t_r} \quad (1)$$

Therefore, since the induced voltage Vs is in proportion to the amplitude value $I_{p-p}$ of the vertical deflection current applied to the vertical deflecting coil 6 as shown above, it is also possible to detect the amplitude value of the vertical deflection current by using the induced voltage Vs'.

Besides, other operations in the second embodiment of the present invention shown in FIG. 10 are exactly the same as the first embodiment of the present invention shown in FIG. 2, thus the same effects as those from the embodiment shown in FIG. 2 are obtainable in the present embodiment, too.

Figure 11:
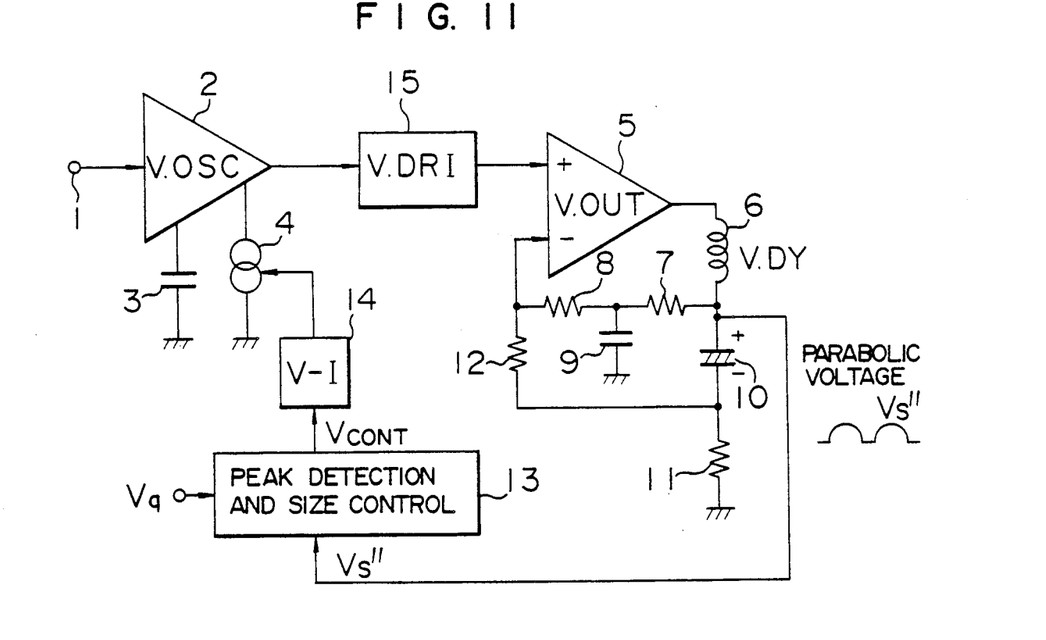
FIG. 11 is a circuit diagram showing a third embodiment of the present invention.

FIG. 11 is a circuit diagram showing a principal part of the picture display unit as a third embodiment of the present invention.

In FIG. 11, those parts that are the same as those shown in FIG. 2 are affixed with the same numerals.

In FIG. 11, a parabolic voltage Vs" in a vertical period is obtained at a junction between the vertical deflecting coil 6 and the capacitor 10, and the crest value thereof is in proportion to the amplitude value of the vertical deflection current applied to the vertical deflecting coil 6. Accordingly, it is also possible to detect the amplitude value of the vertical deflection current by using this parabolic voltage Vs".

Besides, other operations in the third embodiment of the present invention are exactly the same as those in the embodiment shown in FIG. 2, thus the same effects as those from the embodiment shown in FIG. 2 are obtainable in the third embodiment of the present invention, too.

Figure 12:
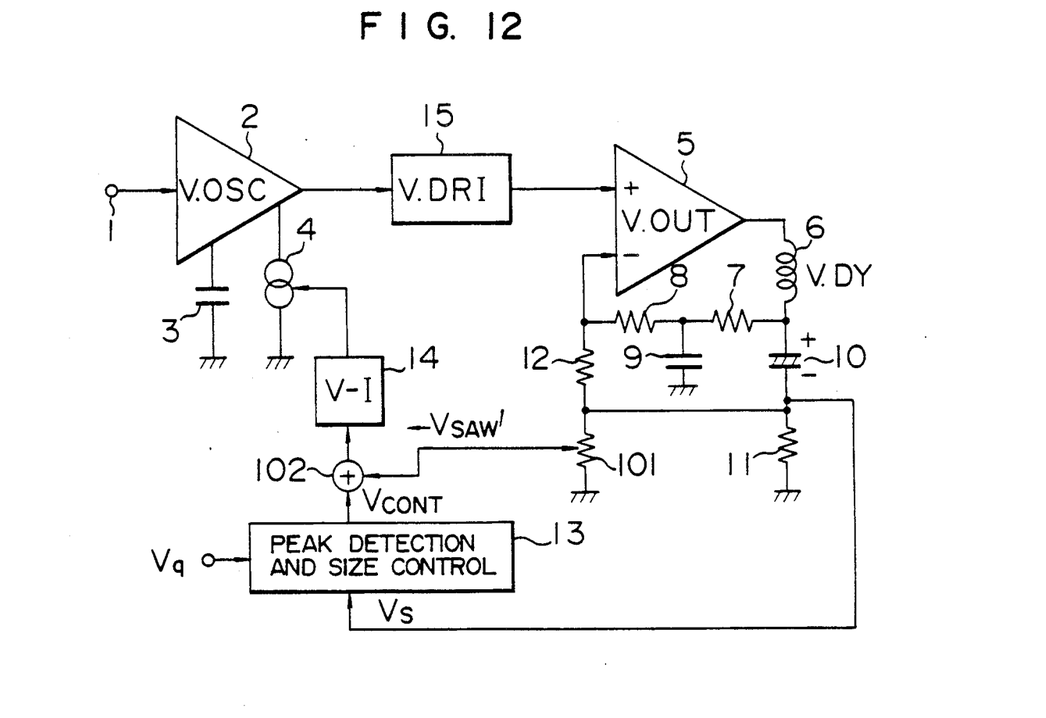
FIG. 12 is a circuit diagram showing a fourth embodiment of the present invention.

FIG. 12 is a circuit diagram showing a principal part of the picture display unit as a fourth embodiment of the present invention.

In FIG. 12, 101 denotes a volume control for vertical linearity compensation, 102 denotes a voltage adder, and other parts that are the same as those shown in FIG. 2 are affixed with the same numerals.

In the fourth embodiment of the present invention, a linearity compensating function for performing linearity compensation of the sawtooth voltage $V_{SAW}$ which is output from the vertical oscillation circuit 2 is added further to the embodiment shown in FIG. 2.

That is, in the fourth embodiment of the present invention, a volume control 101 is connected in parallel with the detection resistance 11, and the sawtooth voltage $V_{SAW}$ obtained from the volume control 101 is added to an error voltage $V_{CONT}$ which is output from the peak detection and size control circuit 13 by means of a voltage adder 102. Then, the added voltage is converted into a current in the voltage-current conversion circuit 14 so as to control the current value of the constant current source 4. With this, it is possible to obtain a sawtooth voltage $V_{SAW}'$ applied with linearity compensation at the output of the vertical oscillation circuit 2, and the compensation quantity of linearity compensation thereof is controllable by means of the volume control 101.

In such a manner, there is such an effect that linearity compensation of the sawtooth voltage $V_{SAW}$ is applicable in the fourth embodiment of the present invention in addition to the effects obtainable in the embodiment shown in FIG. 2.

As described above, the present invention relates to a picture display unit, in particular to the vertical deflection circuit portion thereof. Accordingly, it is needless to say that the present invention may be applied to a horizontal deflection circuit portion which has a circuit composition similar to the vertical deflection circuit portion.

As described above, according to the present invention, there are such excellent effects that it is possible to correspond to every possible vertical scanning frequency because the display size in the vertical direction can be maintained constant even if the vertical scanning frequency is varied, and an optimum display size may be obtained in accordance with the input video signal because the display size may be changed freely to an optional size.

Furthermore, in the present invention, the current value of the constant current source which determines the amplitude value of the output voltage of the vertical oscillation circuit is controlled based on the amplitude value of the vertical deflection current applied to the vertical deflecting coil. Accordingly, it is possible to absorb all element dispersion, temperature characteristics power source voltage fluctuations and so forth if there is any in the vertical drive circuit, the vertical output circuit, the vertical deflecting coil and the like, and the display size will never be varied with the above as a primary factor.

Besides, according to the present invention, since the detected amplitude value is renewed, for example, in every vertical period when the amplitude value of the vertical deflection current is detected in the amplitude detecting means, good follow-up performance is obtainable when above said display size is varied.

We claim:

1. A vertical deflection circuit, comprising:
a vertical oscillation means which generates a deflection voltage ($V_{SAW}$) synchronized with a vertical synchronizing signal (VD), said vertical oscillation means including a constant current source and being capable of varying the amplitude value of said deflection voltage ($V_{SAW}$) by varying the current value of said constant current source;
a vertical drive means which provides a drive signal derived from said deflection voltage produced by said vertical oscillation means;
a vertical output means which applies a vertical deflection current to a vertical deflecting coil based on said drive signal produced by said vertical drive means;
an amplitude detecting means which detects the maximum amplitude value of a vertical deflection current (Vs) after said vertical deflection current (Vs) is applied to said vertical deflecting coil;
a comparison means which compares said maximum amplitude value detected by said amplitude detecting means with a reference value which is set by a setting means; and
a control means which controls the current value of said constant current source in said vertical oscillation means based on the output from said comparison means.

2. A vertical deflection circuit of a picture display unit according to claim 1, wherein a primary winding of a transformer is connected in series with said vertical deflecting coil, and said amplitude detecting means receives a voltage obtained from the secondary winding of said transformer and detects the maximum amplitude value of said vertical deflection current (Vs') based on above said voltage.

3. A vertical deflection circuit of a picture display unit according to claim 1, wherein a d.c. removing capacitor is connected in series with said vertical deflecting coil, and said amplitude detecting means receives a voltage obtained from a junction between said vertical deflecting coil and said d.c. removing capacitor and detects the maximum amplitude value of said vertical deflection current (Vs") based on said voltage.

4. A vertical deflection circuit of a picture display unit according to claim 1, wherein a d.c. removing capacitor is connected in series with said vertical deflecting coil, a detection resistance is connected in series with said d.c. removing capacitor, and said amplitude detecting means receives a voltage obtained from the junction between said d.c. removing capacitor and the detection resistance and detects the maximum amplitude value of said vertical deflection current (Vs) based on said voltage.

5. A vertical deflection circuit of a picture display unit according to claim 4, wherein said comparison means outputs the result of comparison between said maximum amplitude value and said reference value as a voltage, said vertical deflection circuit includes a variable resistance connected in parallel with said detection resistance and an adding means which adds a voltage ($V_{SAW}'$) obtained from a sliding element of said variable resistance to a voltage ($V_{CONT}$) which is output from said comparison means and outputs the added voltage, and said control means controls the current value of said constant current source in said vertical oscillation means based on the output voltage from said adding means.

6. A vertical deflection circuit of a picture display unit according to claim 2, wherein said amplitude detecting means consists of a clamping means which clamps the input voltage at a predetermined level, a rectifying means which rectifies the output voltage from said clamping means, a holding means which holds the maximum voltage of the output voltage from said rectifying means in the form of charge, and a discharge means which discharges said charge held by said holding means during the vertical blanking period based on said vertical synchronizing signal.

7. A vertical deflection circuit of a picture display unit according to claim 3, wherein said amplitude detecting means consists of a clamping means which clamps the input voltage at a predetermined level, a rectifying means which rectifies the output voltage from said clamping means, a holding means which holds the maximum voltage of the output voltage from said rectifying means in the form of charge, and a discharge means which discharges said charge held by said holding means during the vertical blanking period based on said vertical synchronizing signal.

8. A vertical deflection circuit of a picture display unit according to claim 4, wherein said amplitude detecting means consists of a clamping means which clamps the input voltage at a predetermined level, a rectifying means which rectifies the output voltage from said clamping means, a holding means which holds the maximum voltage of the output voltage from said rectifying means in the form of charge, and a discharge means which discharges said charge held by said holding means during the vertical blanking period based on said vertical synchronizing signal.

9. A vertical deflection circuit of a picture display unit according to claim 5, wherein said amplitude detecting means consists of a clamping means which clamps the input voltage at a predetermined level, a rectifying means which rectifies the output voltage from said clamping means, a holding means which holds the maximum voltage of the output voltage from said rectifying means in the form of charge, and a discharge means which discharges said charge held by said holding means during the vertical blanking period based on said vertical synchronizing signal.

10. A vertical deflection circuit of a picture display unit according to claim 6, wherein there is provided a pulse signal generating means for generating a pulse signal which shows said vertical blanking period, and said discharge means discharges said charge held in said holding means based on the pulse signal from said pulse signal generating means.

11. A vertical deflection circuit of a picture display unit according to claim 7, wherein there is provided a pulse signal generating means for generating a pulse signal which shows said vertical blanking period, and said discharge means discharges said charge held in said holding means based on the pulse signal from said pulse signal generating means.

12. A vertical deflection circuit of a picture display unit according to claim 8, wherein there is provided a pulse signal generating means for generating a pulse signal which shows said vertical blanking period, and said discharge means discharges charge held in said holding means based on the pulse signal from said pulse signal generating means.

13. A vertical deflection circuit of a picture display unit according to claim 9, wherein there is provided a pulse signal generating means for generating a pulse signal which shows said vertical blanking period, and said discharge means discharges said charge held in said holding means based on the pulse signal from said pulse signal generating means.

14. A vertical deflection circuit of a picture display unit according to claim 10, wherein said pulse signal generating means generates said pulse signal simultaneously with rise or fall of said vertical synchronizing signal.

15. A vertical deflection circuit of a picture display unit according to claim 11, wherein said pulse signal generating means generates said pulse signal simultaneously with rise or fall of said vertical synchronizing signal.

16. A vertical deflection circuit of a picture display unit according to claim 12, wherein said pulse signal generating means generates said pulse signal simultaneously with rise or fall of said vertical synchronizing signal.

17. A vertical deflection circuit of a picture display unit according to claim 13, wherein said pulse signal generating means generates said pulse signal simultaneously with rise or fall of said vertical synchronizing signal.

18. A vertical deflection circuit of a picture display unit according to claim 2, wherein said amplitude detecting means is composed of an analog-digital conversion means which converts the input voltage into digital data, a holding means which receives digital data from said analog-digital conversion means and holds the maximum value data showing the maximum value among said digital data, and a reset means which resets the maximum value data held in said holding means; said comparison means is composed of a subtraction means which subtracts the data that correspond to said reference value from the maximum value data held in said holding means and outputs the result of subtraction, a coefficient means which multiplies the output data from said subtraction means by a coefficient, and a digital-analog conversion means which converts the output data from said coefficient means into an analog voltage; and there is provided, at least in one of abovementioned amplitude detecting means or comparison means, said analog-digital conversion means, holding means and a clock generating means which generates a time signal for driving said digital-analog conversion means.

19. A vertical deflection circuit a picture display unit according to claim 3, wherein said amplitude detecting means is composed of an analog-digital conversion means which converts the input voltage into digital data, a holding means which receives digital data from said analog-digital conversion means and holds the maximum value data showing the maximum value among said digital data, and a reset means which resets the maximum value data held in said holding means; said comparison means is composed of a subtraction means which subtracts the data that correspond to said reference value from the maximum value data held in said holding means and outputs the result of subtraction, a coefficient means which multiplies the output data from said subtraction means by a coefficient, and a digital-analog conversion means which converts the output data from said coefficient means into an analog voltage; and there is provided, at least in one of abovementioned amplitude detecting means or comparison means, said analog-digital conversion means, holding means and a clock generating means which generates a time signal for driving said digital-analog conversion means.

20. A vertical deflection circuit of a picture display unit according to claim 4, wherein said amplitude detecting means is composed of an analog-digital conversion means which converts the input voltage into digital data, a holding means which receives digital data from said analog-digital conversion means and holds the maximum value data showing the maximum value among said digital data, and a reset means which resets the maximum value data held in said holding means; said comparison means is composed of a subtraction means which subtracts the data that correspond to said reference value from the maximum value data held in said holding means and outputs the result of subtraction, a coefficient means which multiplies the output data from said subtraction means by a coefficient, and a digital-analog conversion means which converts the output data from said coefficient means into an analog voltage; and there is provided, at least in one of abovementioned amplitude detecting means or comparison means, said analog-digital conversion means, holding means and a clock generating means which generates a time signal for driving said digital-analog conversion means.

21. A vertical deflection circuit of a picture display unit according to claim 5, wherein said amplitude detecting means is composed of an analog-digital conversion means which converts the input voltage into digital data, a holding means which receives said digital data from said analog-digital conversion means and holds the maximum value data showing the maximum value among said digital data, and a reset means which resets the maximum value data held in said holding means;
said comparison means is composed of a subtraction means which subtracts the data that correspond to said reference value from the maximum value data held in said holding means and outputs the result of subtraction, a coefficient means which multiplies the output data from said subtraction means by a coefficient, and a digital-analog conversion means which converts the output data from said coefficient means into an analog voltage; and
there is provided, at least in one of abovementioned amplitude detecting means or comparison means, said analog-digital conversion means, holding means and a clock generating means which generates a time signal for driving said digital-analog conversion means.

22. A vertical deflection circuit of a picture display unit according to claim 1, wherein said amplitude detecting means is provided with a temperature compensation means which compensates the variation of the maximum amplitude value of said detected vertical deflection current against changes in temperature.

23. A vertical deflection circuit of a picture display unit according to claim 1, wherein said setting means is disposed in the front portion of said picture display unit.

24. A vertical deflection circuit of a picture display unit according to claim 1, wherein said setting means detects the display size in the vertical direction of a picture to be displayed on a scope based at least on the frequency of the horizontal synchronizing signal in addition to the frequency of said vertical synchronizing signal, and sets said reference value in accordance with the result of detection.

25. A vertical deflection circuit of a picture display unit according to claim 18, wherein said reference data which are input to said subtraction means are set manually.

26. A vertical deflection circuit of a picture display unit according to claim 19, wherein said reference data which are input to said subtraction means are set manually.

27. A vertical deflection circuit of a picture display unit according to claim 20, wherein said reference data which are input to said subtraction means are set manually.

28. A vertical deflection circuit of a picture display unit according to claim 21, wherein said reference data which are input to said subtraction means are set manually.

29. A vertical deflection circuit of a picture display unit according to claim 18, wherein said reference data which are input to said subtraction means are set automatically using a microcomputer.

30. A vertical deflection circuit of a picture display unit according to claim 19, wherein said reference data which are input to said subtraction means are set automatically using a microcomputer.

31. A vertical deflection circuit of a picture display unit according to claim 20, wherein said reference data which are input to said subtraction means are set automatically using a microcomputer.

32. A vertical deflection circuit of a picture display unit according to claim 21, wherein said reference data which are input to said subtraction means are set automatically using a microcomputer.

* * * * *